United States Patent
Moon et al.

(10) Patent No.: US 7,477,604 B2
(45) Date of Patent: Jan. 13, 2009

(54) PACKET COMMUNICATIONS SYSTEM

(75) Inventors: Sung Uk Moon, Yokosuka (JP); Minami Ishii, Yokohama (JP); Takehiro Nakamura, Yokosuka (JP); Masafumi Usuda, Yokosuka (JP); Yasuhiro Kato, Yokohama (JP); Yoshimasa Imamura, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 725 days.

(21) Appl. No.: 10/842,467

(22) Filed: May 11, 2004

(65) Prior Publication Data
US 2004/0228285 A1    Nov. 18, 2004

(30) Foreign Application Priority Data
May 14, 2003  (JP)  ............................. 2003-136137

(51) Int. Cl.
*H04L 12/56* (2006.01)
(52) U.S. Cl. ..................................... 370/235
(58) Field of Classification Search ....................... None
See application file for complete search history.

(56) References Cited

U.S. PATENT DOCUMENTS

| 5,132,964 | A | * | 7/1992 | Esaki | 370/418 |
| 6,101,193 | A | * | 8/2000 | Ohba | 370/429 |
| 6,538,989 | B1 | * | 3/2003 | Carter et al. | 370/229 |
| 6,563,810 | B1 | | 5/2003 | Corazza | |
| 6,856,613 | B1 | * | 2/2005 | Murphy | 370/352 |
| 6,965,566 | B2 | * | 11/2005 | Kawasaki et al. | 370/235 |
| 2002/0160784 | A1 | | 10/2002 | Kuwahara et al. | |
| 2003/0169746 | A1 | * | 9/2003 | Kitazawa et al. | 370/395.42 |
| 2003/0189947 | A1 | * | 10/2003 | Beshai | 370/428 |
| 2004/0125815 | A1 | * | 7/2004 | Shimazu et al. | 370/411 |
| 2004/0151122 | A1 | * | 8/2004 | Lau et al. | 370/252 |
| 2004/0151184 | A1 | * | 8/2004 | Wang et al. | 370/395.2 |
| 2004/0218617 | A1 | * | 11/2004 | Sagfors | 370/412 |
| 2005/0262266 | A1 | * | 11/2005 | Wiberg et al. | 709/238 |

FOREIGN PATENT DOCUMENTS

| EP | 1 271 991 | 1/2003 |
| GB | 2 351 874 | 1/2001 |
| JP | 7-13909 | 1/1995 |
| JP | 11-68880 | 3/1999 |
| JP | 2001-16276 | 1/2001 |
| WO | WO 01/63856 | 8/2001 |
| WO | WO 02/052800 | 7/2002 |

OTHER PUBLICATIONS

3GPP TS 25.321 V5.4.0 (Mar. 2003):3$^{rd}$ Generation Partnership Project; Technical Specification Group Radio Access Network; Medium Access Control (MAC) protocol specification (Release 5), pp. 1-54.
3GPP TS 25.322 V5.4.0 (Mar. 2003):3$^{rd}$ Generation Partnership Project; Technical Specification Group Radio Access Network; Radio Link Control (RLC) protocol specification (Release 5), pp. 1-76.

* cited by examiner

*Primary Examiner*—Anh-Vu H Ly
(74) *Attorney, Agent, or Firm*—Oblon, Spivak, McClelland, Maier & Neustadt, P.C.

(57) ABSTRACT

A packet communications system which transmits a packet at a predetermined transmission rate includes a packet size controller configured to change a size of the packet in accordance with available space of a transmission buffer storing the packet, when the predetermined transmission rate is changed.

10 Claims, 9 Drawing Sheets

FIG.1

RELATED ART

FIG.9

PACKET COMMUNICATIONS SYSTEM

CROSS REFERENCE TO RELATED APPLICATION

This application is based upon and claims the benefit of priority from the prior Japanese Patent Application No. P2003-136137, filed on May 14, 2003; the entire contents of which are incorporated herein by reference.

BACKGROUND OF THE INVENTION

1. Field of the Invention

The present invention relates to a packet communications system transmitting a packet at a predetermined transmission rate.

Especially, the present invention relates to a packet communications system using an HSDPA (High speed downlink packet access) scheme which is a packet communications technique for achieving a speedup of a peak transmission rate, a reduction of transmission delay, an increase in throughput and an improvement of radio resource usage efficiency.

2. Description of the Related Art

Figure 1:
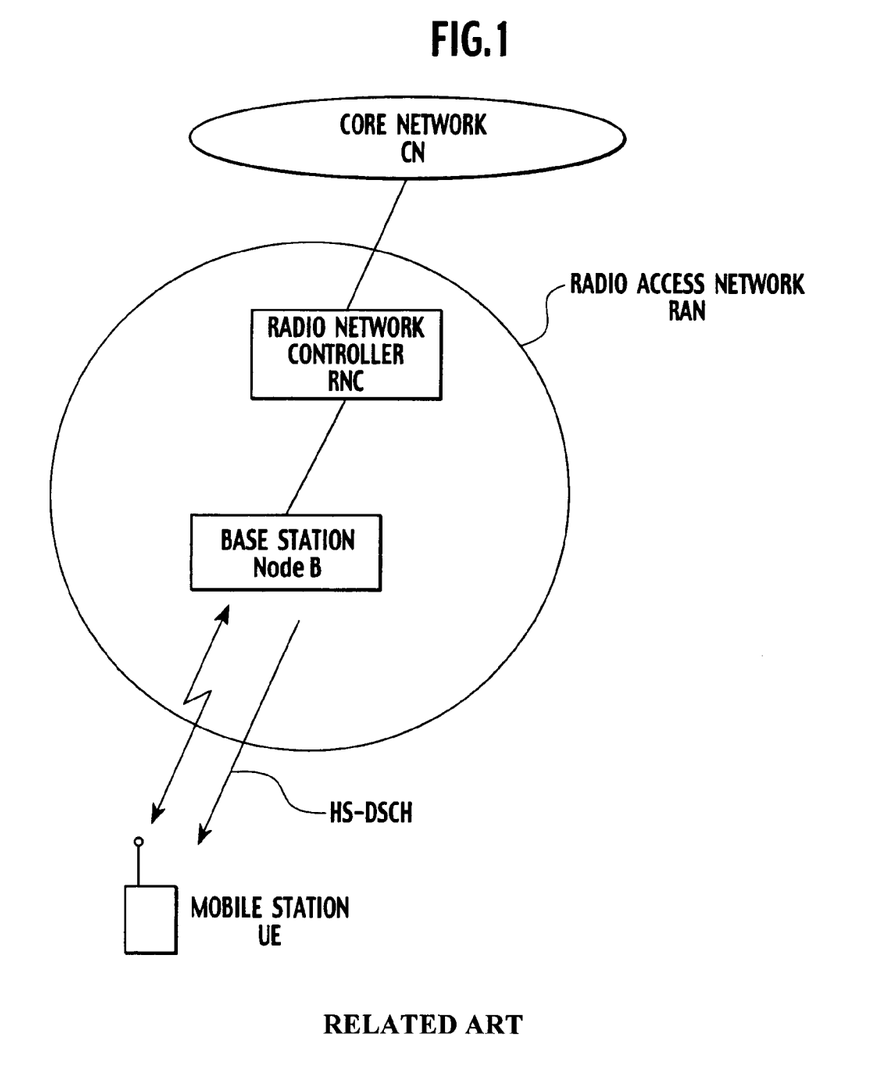
FIG. 1 is a diagram showing the entire configuration of a packet communications system including a radio access network.

FIG. 1 shows a packet communications system using the HSDPA scheme. As shown in FIG. 1, the packet communications system is configured with a core network CN and a radio access network RAN. The radio access network RAN includes a plurality of radio network controllers RNCs and a plurality of base stations (Node Bs).

The radio access network RAN is connected to a plurality of mobile stations (UEs: User Equipments) via radio interfaces. As shown in FIG. 1, the radio access network RAN transmits an HS-DSCH (High speed-Downlink Shared Channel), which is a transport channel for downlink packet transmission, to a mobile station UE.

Referring to a flowchart shown in FIG. 2, an operation of changing a transmission rate of a downlink packet in the conventional packet communications system will be described.

Figure 2:
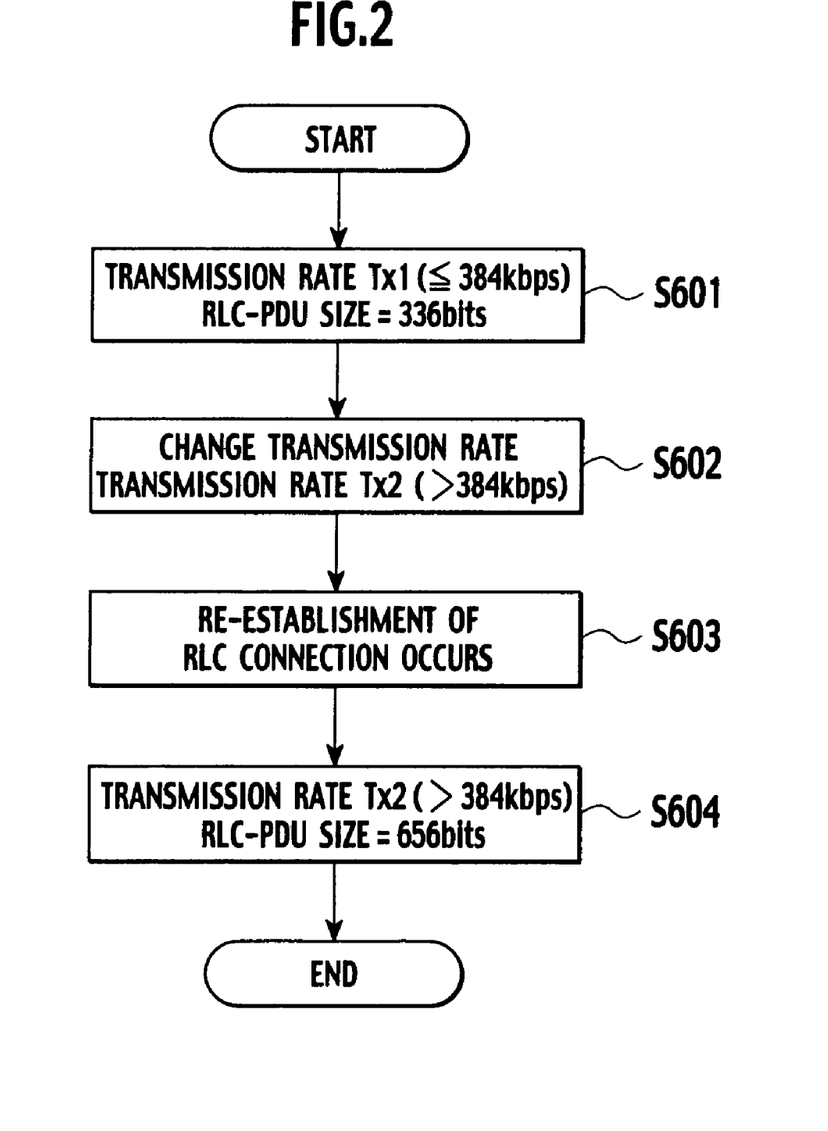
FIG. 2 is a flowchart showing an operation of changing a transmission rate and a size of a packet in the conventional radio access network.

As shown in FIG. 2, in step S601, an RLC (Radio Link Controller) connection is established over a DTCH (Dedicated Traffic Channel), which is a logical channel mapped to the HS-DSCH, between the radio access network RAN and the mobile station UE.

At the time when the RLC connection has been established in step S601, the transmission rate of the downlink packet (a transmission rate of the HS-DSCH or the DTCH) is "TX1" which is smaller than or equal to "384 kbps", and a size of the downlink packet (RLC-PDU: Radio Link Connection-Packet Data Unit) to be transmitted via the RLC connection is "336 bits".

In step S602, the radio access network RAN transmits the transmission rate of the downlink packet, when an amount of data of the downlink packet to be transmitted increases. For example, the transmission rate of the downlink packet is changed to "TX2" which is larger than "384 kbps".

In step S603, a Re-establishment of the RLC connection between the radio access network RAN and the mobile station UE is generated, when the transmission rate of the downlink packet is increased.

Is step S604, the size of the RLC-PDU is changed to "656 bits", after the Re-establishment of the RLC connection is generated.

The above change of the size of the RLC-PDU is performed in consideration with transmission efficiency.

However, there is a problem in that the Re-establishment of the RLC connection when the transmission rate of the downlink packet is changed, so that the packets stored in a transmission buffer are deleted and packet transmission throughput is reduced.

BRIEF SUMMARY OF THE INVENTION

In viewing of the foregoing, it is an object of the present invention to provide a packet communications system which can change the transmission rate of a downlink packet, while preventing the throughput from being reduced, due to the deletion of the packets stored in the transmission buffer.

A first aspect of the present invention is summarized as a packet communications system which transmits a packet at a predetermined transmission rate. The packet communications system includes a packet size controller configured to change a size of the packet in accordance with available space of a transmission buffer storing the packet, when the predetermined transmission rate is changed.

DETAILED DESCRIPTION OF THE INVENTION

<A Configuration of a Packet Communications System According to a First Embodiment of the Present Invention>

Figure 3:
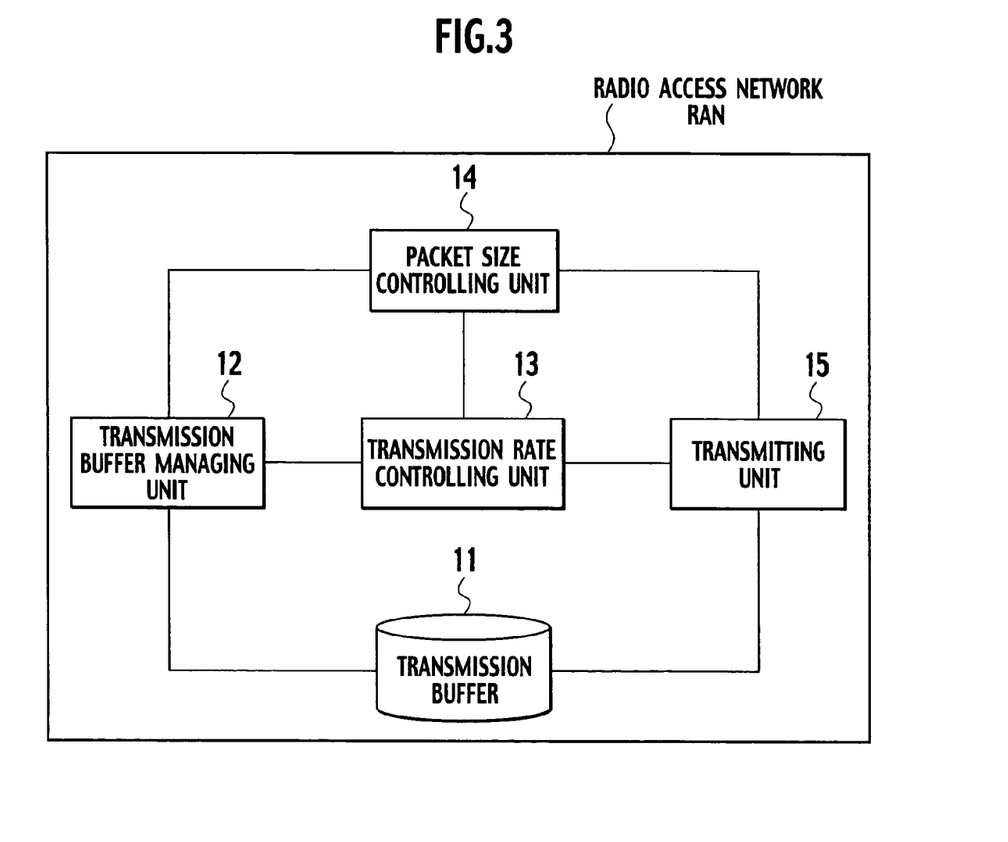
FIG. 3 is a functional block diagram of a radio access network according to one embodiment of the present invention.

Referring to FIG. 3, a configuration of a radio access network RAN in a packet communications system according to a first embodiment of the present invention will be described.

As shown in FIG. 3, the radio access network RAN includes a transmission buffer 11, a transmission buffer managing unit 12, a transmission rate controlling unit 13, a packet size controller 14 and a transmitting unit 15.

The transmission buffer 11 is configured to store packets (RLC-PDUs) to be transmitted to the mobile station UE via the RLC connection.

The transmission buffer 11 can be configured to store packets (RLC-PDUs) to be re-transmitted to the mobile station UE via the RLC connection.

The transmission buffer 11 can be configured to delete packets which have elapsed for a predetermined period since the packets were stored in the transmission buffer 11, and packets which have been re-transmitted a predetermined number of times and the like.

The transmission buffer managing unit 12 is configured to manage available space of a transmission buffer 11. To be more specific, the transmission buffer managing unit 12 is configured to manage an amount of data of packets (the number of bits included in packets or the number of packets) stored in the transmission buffer 11, a remaining amount of the transmission buffer 11 (available space of the transmission buffer 11) and the like.

The transmission rate controlling unit 13 is configured to control the transmission rate of the downlink packet to be transmitted to the mobile station UE.

Figure 4:
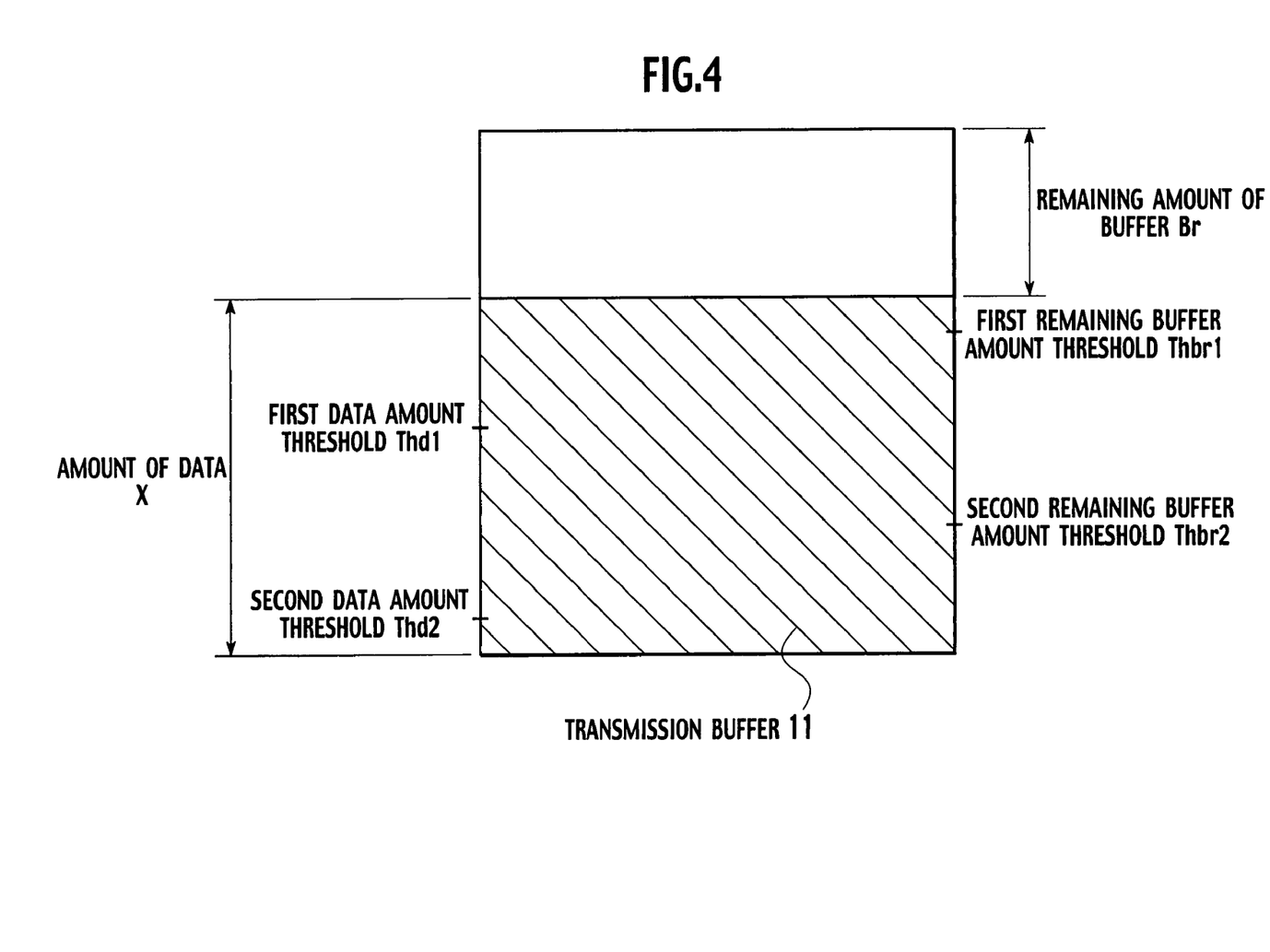
FIG. 4 is a diagram for explaining a transmission buffer in the radio access network according to the embodiment of the present invention.

As shown in FIG. 4, for example, the transmission rate controlling unit 13 can change the transmission rate of the downlink packet from a predetermined transmission rate "TX1" to a higher transmission rate "TX2", when the amount of data X of the packets stored in the transmission buffer 11 is continuously larger than or equal to a second data amount threshold Thd2. For example, the predetermined transmission rate "TX1" is smaller than or equal to "384 kbps", and the higher transmission rate "TX2" is greater than "384 kbps".

The transmission rate controlling unit 13 can change the transmission rate of the downlink packet from the predetermined transmission rate "TX1" to the higher transmission rate "TX2", when the average of the amount of data X of the downlink packets stored in the transmission buffer 11 during a predetermined period is larger than or equal to the second data amount threshold Thd2.

As shown in FIG. 4, the transmission rate controlling unit 13 can change the transmission rate of the downlink packet from the predetermined transmission rate "TX1" to the higher transmission rate "TX2", when a remaining amount Br of the transmission buffer 11 is continuously smaller than or equal to a second remaining buffer amount threshold Thbr2.

The transmission rate controlling unit 13 can change the transmission rate of the downlink packet from the predetermined transmission rate "TX1" to the higher transmission rate "TX2", when the average of the remaining amount Br of the transmission buffer 11 during a predetermined period is continuously smaller than or equal to a second remaining buffer amount threshold Thbr2.

As described above, the transmission rate controlling unit 13 can increase the transmission rate of the downlink packet, when an amount of data to be transmitted increases.

The transmission rate controlling unit 13 can be configured to increase the transmission rate of the downlink packet, when a predetermined condition is satisfied (for example, a radio propagation path between the radio access network RAN and the mobile station UE is improved).

The packet size controller 14 is configured to control a size of a downlink packet (that is, a size of an RLC-PDU) to be transmitted to the mobile station UE via the RLC connection.

The packet size controller 14 is configured to generate an Re-establishment of the RLC connection so as to change the size of the downlink packet, when the transmission rate of the downlink packet is changed.

Basically, the packet size controller 14 is configured to increase the size of the downlink packet, when the transmission rate of the downlink packet is changed from the predetermined transmission rate "TX1" to the higher transmission rate "TX2".

For example, in this case, the packet size controller 14 changes the size of the downlink packet from "336 bits" to "656 bits".

As shown in FIG. 4, however, the packet size controller 14 is configured to maintain the size of the downlink packet without generating the Re-establishment of the RLC connection, when the transmission rate of the downlink packet is changed and when an amount of data X of packets stored in the transmission buffer 11 is larger than or equal to a first data amount threshold Thd1.

As shown in FIG. 4, the packet size controller 14 is configured to maintain the size of the downlink packet without generating the Re-establishment of the RLC connection, when the transmission rate of the downlink packet is changed and when a remaining amount Br of the transmission buffer 11 is smaller than or equal to a first remaining buffer amount threshold Thbr1.

As described above, the packet size controller 14 maintains the size of the downlink packet when a large amount of data of the downlink packets is stored in the transmission buffer 11 (that is, when available space of the transmission buffer 11 is small), so as to prevent the packets stored in the transmission buffer 11 from being deleted due to an occurrence of the Re-establishment of the RLC connection.

The transmitting unit 15 is configured to transmit packets to the mobile station UE, with using a transmission rate instructed by the transmission rate controlling unit 13 and a size of an RLC-PDU instructed by the packet size controller 14.

The transmission buffer 11, the transmission buffer managing unit 12, the transmission rate controlling unit 13 and the packet size controller 14 can be disposed in the radio network controller RNC or the base station which is included in the radio access network RAN.

<An Operation of the Packet Communications System According to the Embodiment>

Figure 5:
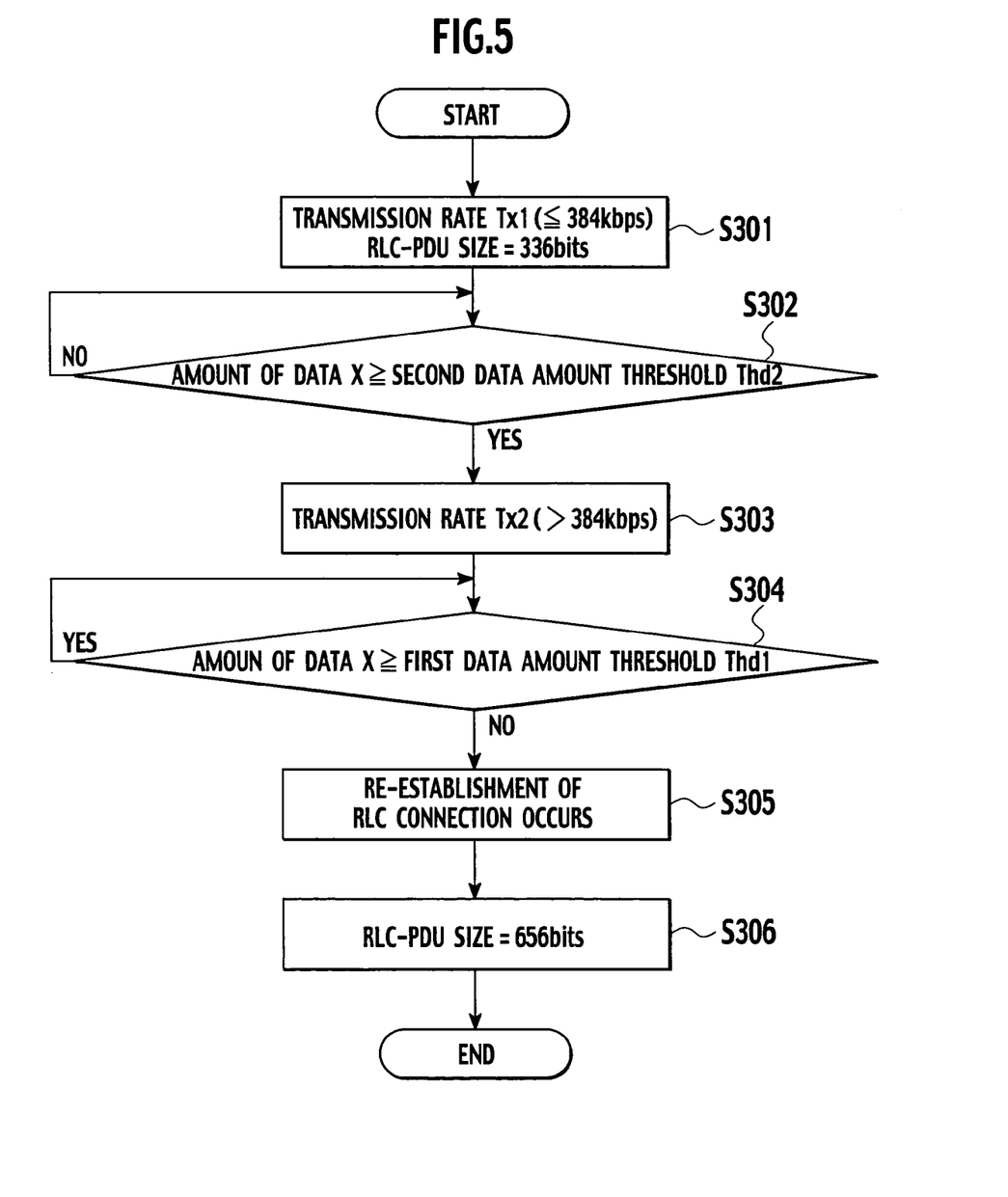
FIG. 5 a flowchart showing an operation of changing a transmission rate and a size of a packet in the radio access network according to the embodiment of the present invention.
Figure 6:
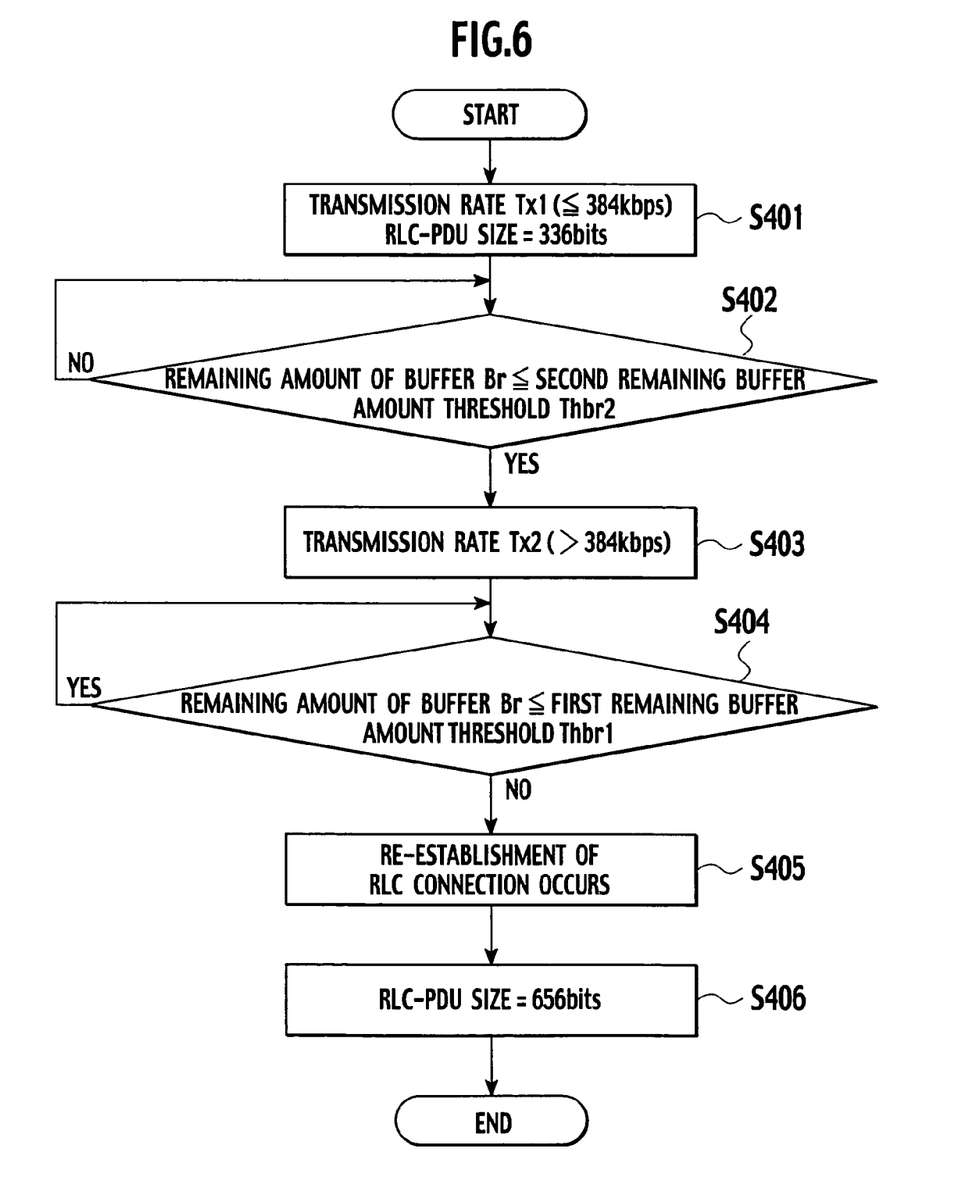
FIG. 6 a flowchart showing an operation of changing a transmission rate. and a size of a packet in the radio access network according to the embodiment of the present invention.

Referring to FIGS. 5 and 6, an operation of changing the transmission rate of the downlink packet in the packet communications system according to the above embodiment will be described.

As shown in FIG. 5, in step S301, an RLC connection is established between the radio access network RAN and the mobile station UE.

At the time when the RLC connection has been established in step S301, the transmission rate of the downlink packet is "TX1" which is smaller than or equal to "384 kbps", and a size of the RLC-PDU is "336 bits".

In step S302, the transmission rate controlling unit 13 of the radio access network RAN determines whether an amount of data X of packets stored in the transmission buffer 11 is larger than or equal to the second data amount threshold Thd2 or not.

When the amount of data X is larger than or equal to the second data amount threshold Thd2, the operation goes to step S303. When the amount of data X is smaller than the second data amount threshold Thd2, the operation repeats step S302.

In step S303, the transmission rate controlling unit 13 changes the transmission rate of the downlink packet. That is, the transmission rate of the downlink packet is changed to "TX2" which is larger than "384 kbps".

In step S304, the packet size controlling unit 14 of the radio access network RAN determines whether the amount of data X of packets stored in the transmission buffer 11 is larger than or equal to the first data amount threshold Thd1 or not.

When the amount of data X is larger than or equal to the first data amount threshold Thd1, the operation goes to step S305. When the amount of data X is smaller than the first data amount threshold Thd1, the operation repeats step S304.

In step S305, a Re-establishment of the RLC connection between the radio access network RAN and the mobile station UE is generated.

In step S306, the size of the RLC-PDU is changed to "656 bits", after the Re-establishment of the RLC connection is generated.

As shown in FIG. 6, the method of packet communications according to the embodiment can replace steps S302 and S304 shown in FIG. 5 with steps S402 and S404 respectively, so as to change the transmission rate of the downlink packet.

As shown in FIG. 6, in step S402, the transmission rate controlling unit 13 of the radio access network RAN determines whether a remaining amount Br of the transmission buffer 11 is smaller than or equal to the second remaining buffer amount threshold Thbr2 or not.

When the remaining amount Br is smaller than or equal to the second remaining buffer amount threshold Thbr2, the operation goes to step S403. When the remaining amount Br is larger than the second remaining buffer amount threshold Thbr2, the operation repeats step S402.

In step S404, the packet size controlling unit 14 of the radio access network RAN determines whether the remaining amount Br of the transmission buffer 11 is smaller than or equal to the first remaining buffer amount threshold Thbr1 or not.

When the remaining amount Br is smaller than or equal to the first remaining buffer amount threshold Thbr1, the operation goes to step S405. When the remaining amount Br is larger than the first remaining buffer amount threshold Thbr1, the operation repeats step S404.

Figure 7:
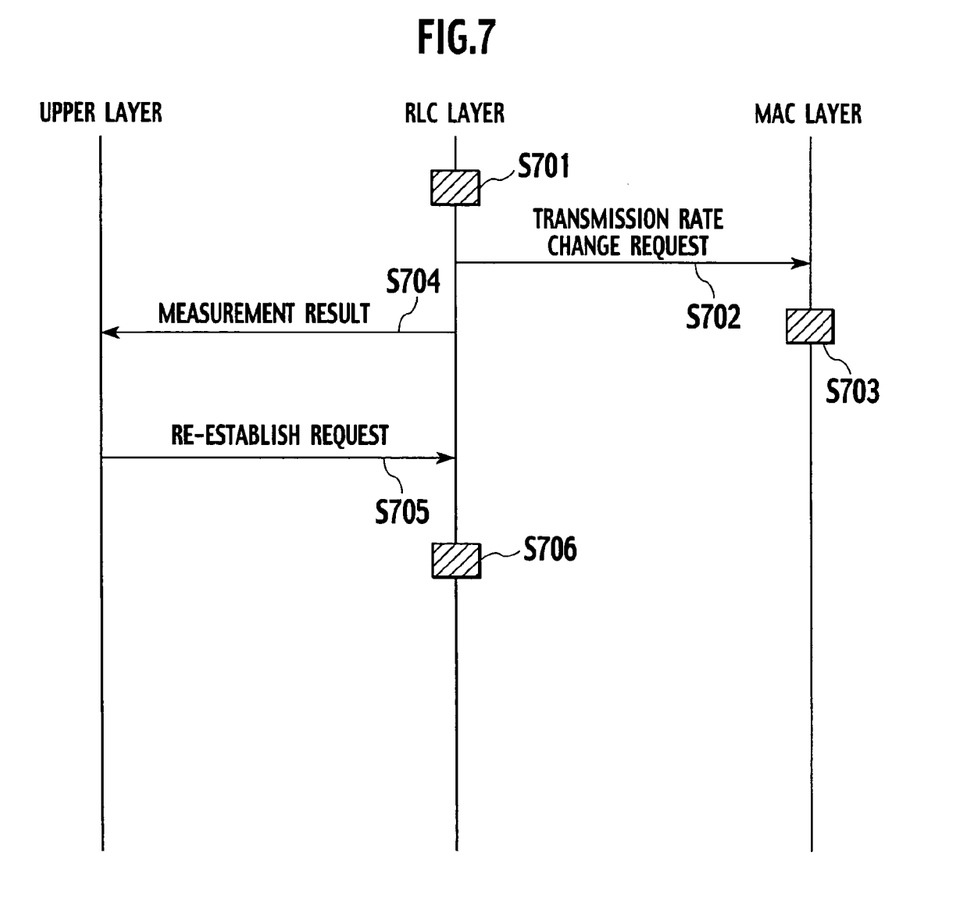
FIG. 7 is a sequence diagram showing an operation of changing a transmission rate and a size of a packet, in a protocol architecture of the radio access network according to the embodiment of the present invention.
Figure 8:
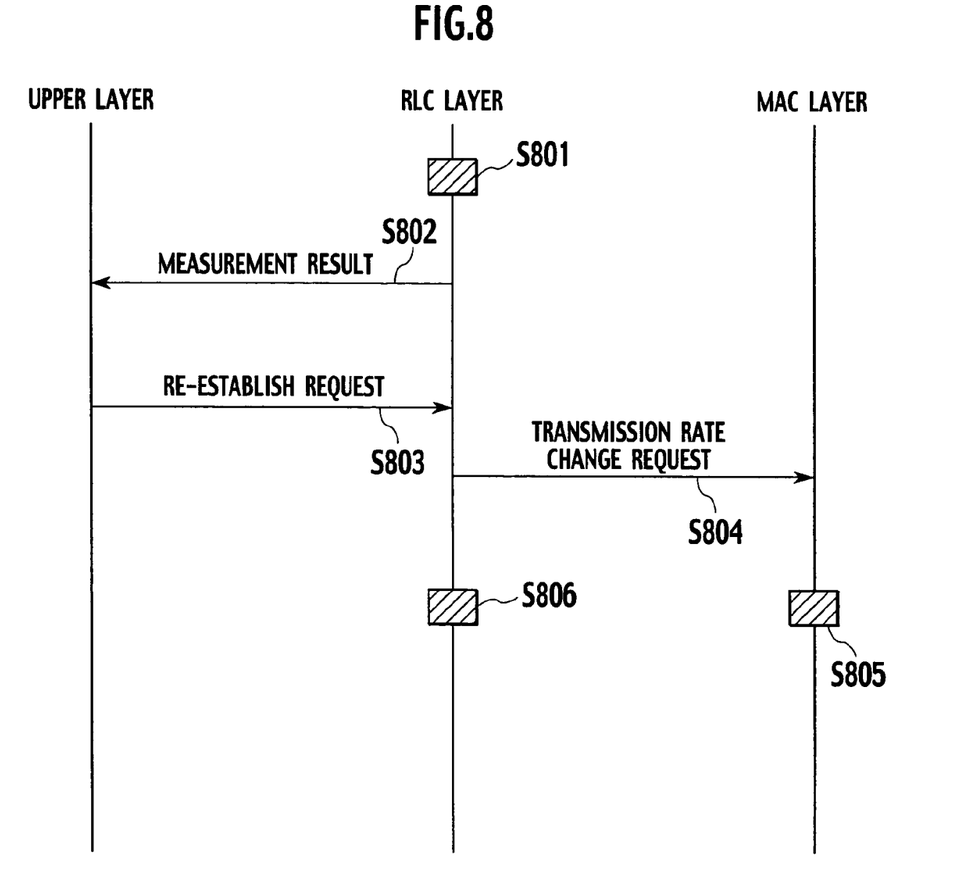
FIG. 8 is a sequence diagram showing an operation of changing a transmission rate and a size of a packet, in a protocol architecture of the radio access network according to the embodiment of the present invention.
Figure 9:
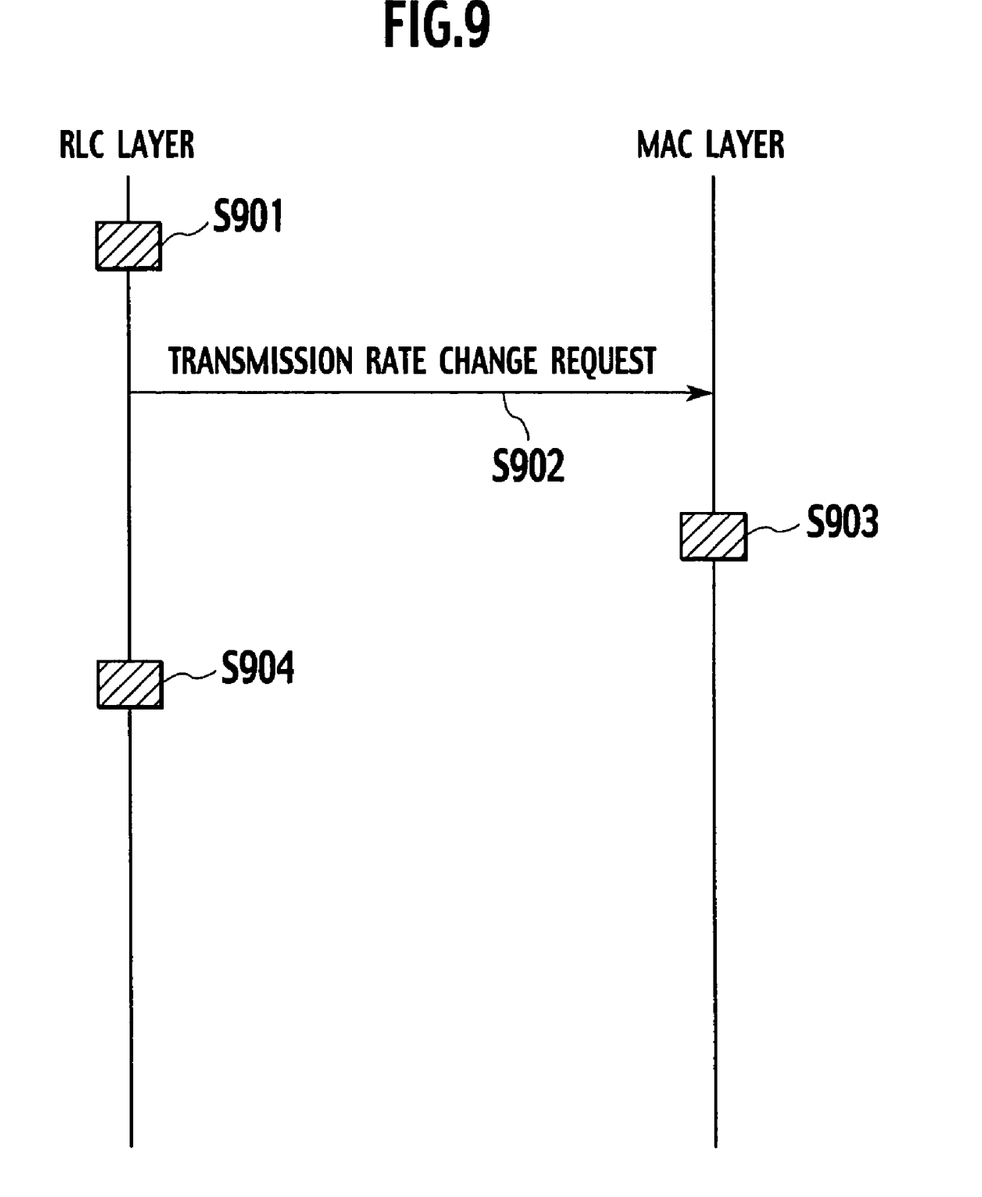
FIG. 9 is a sequence diagram showing an operation of changing a transmission rate and a size of a packet, in a protocol architecture of the radio access network according to the embodiment of the present invention.

Referring to FIGS. 7 to 9, the operation of changing the transmission rate of the downlink packet in the radio access network RAN will be described in consideration of a protocol architecture.

First, an example of FIG. 7 will be explained. In step S701, a protocol function of an RLC layer (an RLC entity) of the radio access network RAN monitors an amount of data X of RLC-PDUs, which are stored in the transmission buffer 11, to be transmitted or re-transmitted to the mobile station UE via an RLC connection.

In step S702, the RLC entity instructs a protocol function of a MAC layer (a MAC entity) to change a transmission rate of a DTCH related to the RLC connection from a predetermined transmission rate "TX1" to a higher transmission rate "TX2", when a predetermined condition is satisfied in the transmission buffer 11.

For example, the RLC entity instructs the MAC entity to increase the transmission rate of the DTCH, when an amount of data X of RLC-PDUs stored in the transmission buffer 11 is continuously larger than or equal to the second data amount threshold Thd2, or when a remaining amount Br of the transmission buffer 11 is continuously smaller than or equal to the second remaining buffer amount threshold Thbr2.

In step S703, the MAC entity instructs a protocol function of a physical layer to change a transmission rate of an HS-DSCH mapped to the DTCH from the predetermined transmission rate "TX1" to the higher transmission rate "TX2", in accordance with the instruction from the RLC entity.

The protocol function of the physical layer changes a transmission rate of a physical channel mapped to the HS-DSCH from the predetermined transmission rate "TX1" to the higher transmission rate "TX2", in accordance with the instruction from the MAC entity.

In step S704, the RLC entity notifies a measurement result of the amount of data X of the RLC-PDUs stored in the transmission buffer 11 to a protocol function of an upper layer, when having instructed the MAC entity to change the transmission rate of the DTCH.

In step S705, the protocol function of the upper layer determines whether or not the amount of data X of the RLC-PDUs stored in the transmission buffer 11 is larger than or equal to the first data amount threshold Thd1, or whether or not the remaining amount Br of the transmission buffer 11 is smaller than or equal to the first remaining buffer amount threshold Thbr1.

When the amount of data X of the RLC-PDUs stored in the transmission buffer 11 is smaller than the first data amount threshold Thd1, or when the remaining amount Br of the transmission buffer 11 is larger than the first remaining buffer amount threshold Thbr1, the protocol function of the upper layer notifies an Re-establishment request to the RLC entity. The Re-establishment request is a request for instructing to change a size of an RLC-PDU.

On the other hand, when the amount of data X of the RLC-PDUs stored in the transmission buffer 11 is larger than or equal to the first data amount threshold Thd1, or when the remaining amount Br of the transmission buffer 11 is smaller than or equal to the first remaining buffer amount threshold Thbr1, the protocol function of the upper layer does not notify the Re-establishment request to the RLC entity.

In step S706, the RLC entity performs an Re-establishment processing, in response to the Re-establishment request from the protocol function of the upper layer.

To be more specific, the RLC entity establishes a new RLC connection with an RLC entity of the mobile station UE, after discarding all the RLC-PDUs stored in the transmission buffer 11.

A size of RLC-PDUs to be transmitted over the newly established RLC connection has been changed to a size instructed by the Re-establishment request, and is normally larger than the size of RLC-PDUs to be transmitted over the previous RLC connection.

Second, an example of FIG. 8 will be explained. In step S801, the RLC entity of the radio access network RAN monitors an amount of data X of RLC-PDUs, which are stored in the transmission buffer 11, to be transmitted or re-transmitted to the mobile station UE via an RLC connection.

In step S802, the RLC entity notifies a measurement result of the amount of data X of the RLC-PDUs stored in the transmission buffer 11 to the protocol function of the upper layer, at predetermined intervals.

In step S803, the protocol function of the upper layer determines whether or not to change a transmission rate and a size of an RLC-PDU to be transmitted over the RLC connection, in accordance with the measurement result notified from the RLC entity.

When a predetermined condition is satisfied in the transmission buffer 11, the protocol function of the upper layer notifies the Re-establishment request for instructing to change the transmission rate and the size of the RLC-PDU, to the RLC entity.

For example, when the amount of data X of the RLC-PDUs stored in the transmission buffer 11 is continuously larger than or equal to the second data amount threshold Thd2, and when the amount of data X of the RLC-PDUs stored in the transmission buffer 11 is continuously smaller than the first data amount threshold Thd1, the protocol function of the upper layer notifies the Re-establishment request to the RLC entity.

Also, when the remaining amount Br of the transmission buffer 11 is continuously smaller than or equal to the second remaining buffer amount threshold Thbr2, and when the remaining amount Br of the transmission buffer 11 is continuously larger than the first remaining buffer amount threshold Thbr1, the protocol function of the upper layer notifies the Re-establishment request to the RLC entity.

Otherwise, the protocol function of the upper layer does not notify the Re-establishment request to the RLC entity.

In step S804, the RLC entity instructs the MAC entity to change a transmission rate of a DTCH related to the RLC connection from the a predetermined transmission rate "TX1" to a higher transmission rate "TX2" which is instructed by the Re-establishment request, in response to the Re-establishment request from the protocol function of the upper layer.

In step S805, the MAC entity instructs the protocol function of the physical layer to change a transmission rate of an HS-DSCH mapped to the DTCH from the predetermined transmission rate "TX1" to the higher transmission rate "TX2", in response to the instruction from the RLC entity.

The protocol function of the physical layer changes a transmission rate of a physical channel mapped to the HS-DSCH from the predetermined transmission rate "TX1" to the higher transmission rate "TX2", in response to the instruction from the MAC entity.

As in the case of step 706 in FIG. 7, in step S806, the RLC entity performs the Re-establishment processing, in response to the Re-establishment request from the protocol function of the upper layer.

Third, an example of FIG. 9 will be explained. In step S901, the RLC entity of the radio access network RAN monitors an amount of data X of RLC-PDUs, which are stored in the transmission buffer 11, to be transmitted or re-transmitted to the mobile station UE via an RLC connection.

In step S902, the RLC entity determines whether or not to change a transmission rate and a size of an RLC-PDU to be transmitted over the RLC connection, in accordance with a measurement result of the amount of data X of the RLC-PDUs stored in the transmission buffer 11.

In step S902, the RLC entity instructs the MAC entity to change a transmission rate of the RLC-PDU, when a predetermined condition is satisfied.

For example, the RLC entity instructs the MAC entity to change a transmission rate of a DTCH related to the RLC connection from the a predetermined transmission rate "TX1" to a higher transmission rate "TX2", when the amount of data X of the RLC-PDUs stored in the transmission buffer 11 is continuously larger than or equal to the second data amount threshold Thd2, or when the remaining amount Br of the transmission buffer 11 is continuously smaller than or equal to the second remaining buffer amount threshold Thbr2.

In step S903, the MAC entity instructs the protocol function of the physical layer to change a transmission rate of an HS-DSCH mapped to the DTCH from the predetermined transmission rate "TX1" to the higher transmission rate "TX2", in response to the instruction from the RLC entity.

The protocol function of the physical layer changes a transmission rate of a physical channel mapped to the HS-DSCH from the predetermined transmission rate "TX1" to the higher transmission rate "TX2", in response to the instruction from the MAC entity.

In step S904, the RLC entity determines whether or not the amount of data X of the RLC-PDUs stored in the transmission buffer 11 is continuously larger than or equal to the first data amount threshold Thd1, or whether or not the remaining amount Br of the transmission buffer 11 is continuously smaller than or equal to the first remaining buffer amount threshold Thbr1, when having instructed the MAC entity to change the transmission rate of the DTCH.

As in the case of step 706 in FIG. 7, when the amount of data X of the RLC-PDUs stored in the transmission buffer 11 is not continuously larger than or equal to the first data amount threshold Thd1, or when the remaining amount Br of the transmission buffer 11 is not continuously smaller than or equal to the first remaining buffer amount threshold Thbr1, the RLC entity performs the Re-establishment processing.

Otherwise, when the amount of data X of the RLC-PDUs stored in the transmission buffer 11 is continuously larger than or equal to the first data amount threshold Thd1, or when the remaining amount Br of the transmission buffer 11 is continuously smaller than or equal to the first remaining buffer amount threshold Thbr1, the RLC entity does not perform the Re-establishment processing.

<Functions and Effects of the Packet Communications System According to the Embodiment>

The packet communications system according to the embodiment can change the size of the RLC-PDU in accordance with available space of the transmission buffer 11, so as to prevent packets stored in the transmission buffer 11 from being deleted due to the Re-establishment of the RLC connection.

For example, the packet communications system according to the embodiment can maintain the size of the RLC-PDU, when a large amount of data of the downlink packets is stored in the transmission buffer 11 (that is, when available space of the transmission buffer 11 is small), so as to prevent packets stored in the transmission buffer 11 from being deleted due to the Re-establishment of the RLC connection.

The present invention can provide a packet communications system which can change the transmission rate of a downlink packet, while preventing the throughput from being reduced, due to the deletion of the packets stored in the transmission buffer.

Additional advantages and modifications will readily occur to those skilled in the art. Therefore, the invention in its broader aspects is not limited to the specific details and the representative embodiment shown and described herein. Accordingly, various modifications may be made without departing from the scope of the general inventive concept as defined by the appended claims and their equivalents.

What is claimed is:

1. A packet communications system which transmits a packet at a predetermined transmission rate, the system comprising:
   a packet size controller configured to change a size of the packet in accordance with available space of a transmission buffer storing the packet, when the predetermined transmission rate is changed,
   wherein the packet size controller is configured to maintain the size of the packet, when an amount of data of the packet stored in the transmission buffer is larger than a first data amount threshold.

2. The packet communications system according to claim 1, further comprising
   a transmission rate controller configured to increase the predetermined transmission rate, when an amount of data of the packet stored in the transmission buffer is larger than a second data amount threshold.

3. The packet communications system according to claim 2, wherein
the transmission rate controller is configured to change the predetermined transmission rate, when the amount of data of the packet stored in the transmission buffer is continuously larger than the second data amount threshold during a predetermined period.

4. The packet communications system according to claim 1, further comprising
a transmission rate controller configured to increase the predetermined transmission rate, when a remaining amount of the transmission buffer is smaller than a remaining buffer amount threshold.

5. The packet communications system according to claim 4, wherein
the transmission rate controller is configured to increase the predetermined transmission rate, when the remaining amount of the transmission buffer is continuously smaller than the remaining buffer amount threshold during a predetermined period.

6. A packet communications system which transmits a packet at a predetermined transmission rate, the system comprising:
a packet size controller configured to change a size of the packet in accordance with available space of a transmission buffer storing the packet, when the predetermined transmission rate is changed,
wherein the packet size controller is configured to maintain the size of the packet, when a remaining amount of the transmission buffer is smaller than a first remaining buffer amount threshold.

7. The packet communications system according to claim 6, further comprising
a transmission rate controller configured to increase the predetermined transmission rate, when an amount of data of the packet stored in the transmission buffer is larger than a data amount threshold.

8. The packet communications system according to claim 7, wherein
the transmission rate controller is configured to change the predetermined transmission rate, when the amount of data of the packet stored in the transmission buffer is continuously larger than the data amount threshold during a predetermined period.

9. The packet communications system according to claim 6, further comprising
a transmission rate controller configured to increase the predetermined transmission rate, when a remaining amount of the transmission buffer is smaller than a second remaining buffer amount threshold.

10. The packet communications system according to claim 9, wherein
the transmission rate controller is configured to increase the predetermined transmission rate, when the remaining amount of the transmission buffer is continuously smaller than the second remaining buffer amount threshold during a predetermined period.

* * * * *